United States Patent [19]

Yamanaka

[11] Patent Number: 4,960,313

[45] Date of Patent: Oct. 2, 1990

[54] APPARATUS FOR ROTATING A LIGHT IMAGE AND AN OPTICAL SYSTEM FOR FOCUSING LIGHT BEAMS ON A RECORDING MEDIUM

[75] Inventor: Yutaka Yamanaka, Tokyo, Japan

[73] Assignee: NEC Corporation, Tokyo, Japan

[21] Appl. No.: 294,702

[22] Filed: Jan. 9, 1989

[30] Foreign Application Priority Data

Jan. 7, 1988 [JP] Japan ................................. 63-2325
Jun. 28, 1988 [JP] Japan ............................... 63-158114

[51] Int. Cl.$^5$ ........................................... G02B 26/10
[52] U.S. Cl. ...................................... 350/6.1; 350/6.4; 355/60; 358/206; 358/489
[58] Field of Search ............. 350/6.1, 6.2, 6.4, 6.91, 350/286, 6.7; 355/55, 60; 250/578, 202, 203.4; 358/480, 481, 482, 489, 206

[56] References Cited

U.S. PATENT DOCUMENTS

| | | | |
|---|---|---|---|
| 2,928,952 | 3/1960 | Bednaz | 350/6.4 |
| 3,647,961 | 3/1972 | Blitchington, Jr. et al. | 350/6.4 |
| 4,376,582 | 3/1983 | Kirchner et al. | 350/6.4 |
| 4,606,601 | 8/1986 | Starkweather | 350/6.4 |
| 4,773,754 | 9/1988 | Eisele | 350/6.4 |

OTHER PUBLICATIONS

Pp. 121 to 126 of the report in "Optical Memory Symposium '86", held on Dec. 17, 1986 in Tokyo.

Primary Examiner—Bruce Y. Arnold
Assistant Examiner—Loha Ben
Attorney, Agent, or Firm—Sughrue, Mion, Zinn, Macpeak & Seas

[57] ABSTRACT

An apparatus for rotating a light image comprises an optical medium such as a Dove prism, an assembly of three mirrors, a triangle prism etc., and a unit for rotating the optical medium. The optical medium is provided with n reflection planes in number each having a normal included in a predetermined plane including a reference light axis, where n is an odd number (n=1, 3, 5 . . . ). When an incident light beam parallel to the reference light axis is supplied to the optical medium, an output light beam having a predetermined rotating angle relative to the incident light beam is obtained by rotating the optical medium around a line parallel to the reference light axis. An optical system for focusing a light image further comprises a light source for radiating a plurality of light beams, and a focusing lens for focusing the light beams on a recording medium such as an optical disk, a photosensitive drum etc. The optical medium is positioned between the light source and the focusing lens, so that a line connecting beam spots formed on the recording medium by focusing the light beams is rotated by rotating the optical medium.

4 Claims, 4 Drawing Sheets

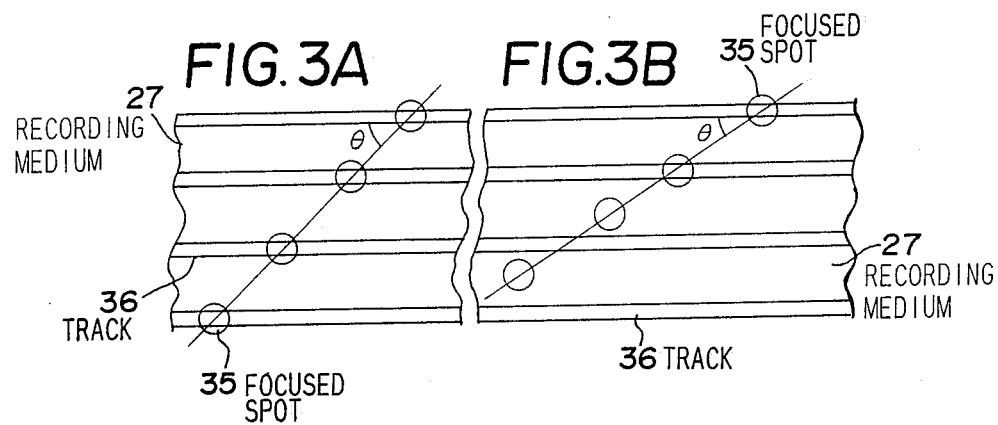
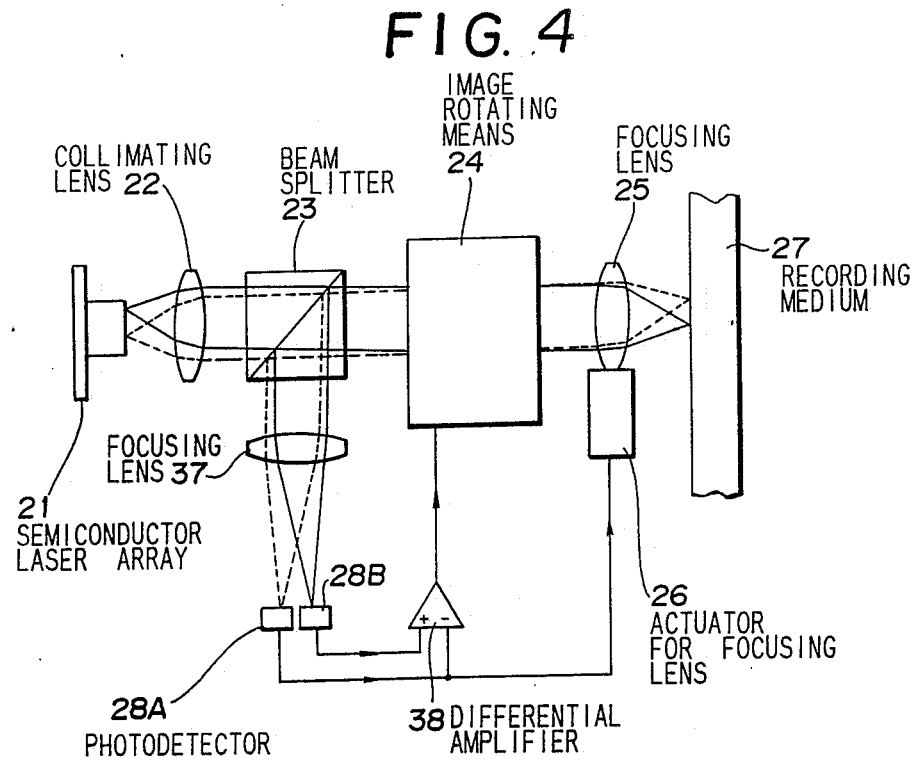

APPARATUS FOR ROTATING A LIGHT IMAGE AND AN OPTICAL SYSTEM FOR FOCUSING LIGHT BEAMS ON A RECORDING MEDIUM

FIELD OF THE INVENTION

The invention relates to an apparatus for rotating a light image and to an optical system for focusing light beams on a recording medium, and more particularly to an apparatus through which a light image is transmitted to be rotated by a predetermined angle on a plane orthogonal to a light axis of the light image and to an optical system in which a plurality of light beams to be focused on a recording medium is rotated by the apparatus.

BACKGROUND OF THE INVENTION

These days, an optical system such as a laser printer, an optical head etc. in which a plurality of light beams radiated from a plurality of light emitting sources are focused on a recording medium by a focusing lens has been studied for the purpose of a high speed and functionable performance based on a parallel light beam operation.

This type of an optical head in which two light beams are focused on a recording medium comprises a semiconductor laser array for emitting two light beams, a collimating lens for collimating the two light beams, a beam splitter for transmitting the two light beams therethrough and reflecting two light beams reflected from a recording medium, a focusing lens for focusing the two light beams transmitted through the beam splitter on the recording medium, and an optical detecting system in which the two light beams reflected from the beam splitter are received to read information from the recording medium and to detect focusing and tracking errors.

In operation, the two light beams are radiated from the semiconductor laser array, and then collimated by the collimating lens. The two light beams thus collimated are transmitted through the beam splitter, and then focused on the recording medium by the focusing lens. The two light beams are reflected from the recording medium, and then collimated by the focusing lens. The two light beams propagated in the reverse direction are reflected in the direction of the optical detecting system by the beam splitter, so that information is read from the recording medium in the optical detecting system, and focusing and tracking errors are detected therein. The focusing lens is controlled to be corrected in its position based on the focusing and tracking errors by an actuator.

There is another optical head which comprises first and second semiconductor lasers in place of the semiconductor laser array, and further comprises a collimating lens for collimating light beam radiated from the second semiconductor laser, a wedge prism positioned on a light path of the light beam from the second semiconductor laser and for rotating a line connecting two beam spots defined on the recording medium by focusing light beams from the first and second semiconductor lasers thereon, and an optical combiner for combining the two light beams from the first and second semiconductor lasers.

In operation, the light beam which is radiated from the first semiconductor laser and then collimated by the collimating lens, and the light beam which is radiated from the second semiconductor laser and then collimated by the added collimating lens are combined by the optical combiner, so that the two light beams thus combined are transmitted through the beam splitter to perform the same operation as that explained in the former optical head.

In the former and latter optical heads, the two light beams which are radiated from the semiconductor laser array and the first and second semiconductor lasers are utilized. In accordance with the adoption of, for instance, four light emitting sources, four light beams are utilized, so that four beam spots are defined on four corresponding tracks of the recording medium. Even if the four beam spots are exactly positioned on the corresponding tracks, some of the spots are deviated off the tracks due to the mechanical precision of the optical head when it is moved to access the recording medium. Such a deviation of beam spots are corrected in accordance with the rotation of a whole optical head in case of the former optical head, and an angular motion of the wedge prism in case of the latter optical head, so that an angle of the line connecting the two beam spots is controlled relative to a track of the recording medium to result in the exact position of the beam spots on corresponding tracks. The wedge prism system as explained above is described on pages 121 to 126 of the report in "Optical memory symposium 86" held on Dec. 17, 1986 in Tokyo.

According to the former optical head, however, there are disadvantages that a high speed control of moving a whole optical head is not expected and a mechanism thereof becomes large because the whole optical head is relatively heavy and requires a predetermined size.

Further, according to the latter optical head, there are disadvantages that a construction becomes complicated because the number of wedge prisms is increased dependent on that of light beams, and that semiconductor laser array can not be utilized because light beam controlled by a wedge prism must be on a light path independently of other light beams.

SUMMARY OF THE INVENTION

Accordingly, it is an object of the invention to provide an apparatus for rotating a light image and an optical system for focusing light beams on a recording medium in which a high speed control of rotating a light image is expected and a mechanism thereof does not become large.

It is a further object of the invention to provide an apparatus for rotating a light image and an optical system for focusing light beams on a recording medium in which a construction thereof is simple and a semiconductor laser array can be utilized.

According to a feature of the invention, an apparatus for rotating a light image comprises, an optical medium having n reflection planes in number, where n is an odd number (n = 1, 3, 5 ...), said optical medium receiving an incident light beam parallel to a reference light axis and transmitting an output light beam parallel to said reference light axis, each of said n reflection planes having a normal included in a predetermined plane including said reference light axis, and means for rotating said optical medium around a line parallel to said reference light axis by a predetermined angle based on a rotating angle of a light image.

According to a further feature of the invention, an optical system for focusing light beams on a recording medium comprises, means for radiating a plurality of light beams, a focusing lens for focusing said plurality of light beams on said recording medium, and a light image rotating unit positioned between said means for radiating and said focusing lens, wherein said light image rotating unit includes, an optical medium having n reflection planes in number, where n is an odd number (n = 1, 3, 5 ...), said optical medium receiving an incident light beam parallel to a reference light axis and transmitting an output light beam parallel to said reference light axis, each of said n reflection planes having a normal included in a predetermined plane including said reference light axis, and means for rotating said optical medium around a line parallel to said reference light axis by a predetermined angle based on a rotating angle of a light image.

BRIEF DESCRIPTION OF THE DRAWINGS

The invention will be described in more detail in conjunction with appended drawings wherein FIGS. 3A and 3B are diagrams explaining states of beam spots defined on a recording medium, FIG. 4 is an explanatory diagram showing an optical head in an embodiment according to the invention.

DESCRIPTION OF PREFERRED EMBODIMENTS

Before explaining a preferred embodiment according to the invention, the aforementioned former and latter optical head will be explained.

Figure 1:
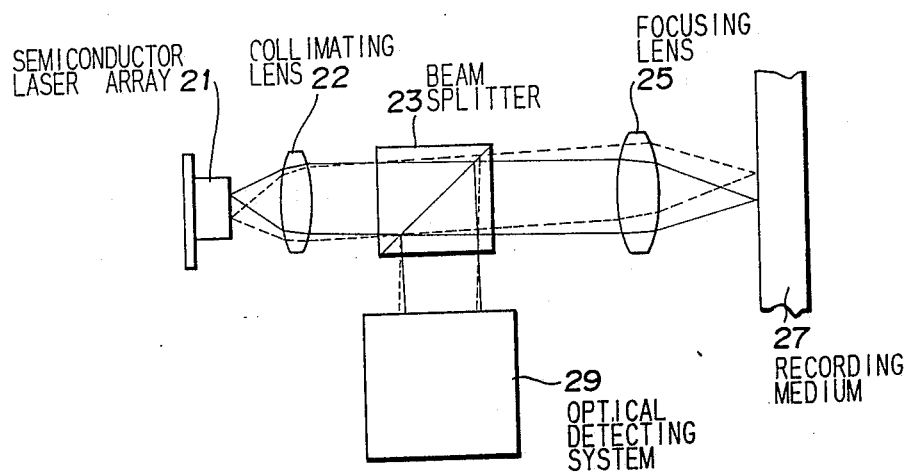
FIGS. 1 and 2 are explanatory diagrams showing conventional optical heads.

FIG. 1 shows the former optical head which comprises a semiconductor laser array 21 for emitting two light beams, a collimating lens 22 for collimating the two light beams, a beam splitter 23 for transmitting the two light beams therethrough and reflecting two light beams reflected from a recording medium 27, a focusing lens 25 for focusing the two light beams transmitted through the beam splitter 23 on the recording medium 27, and an optical detecting system 29 for receiving the two light beams reflected from the beam splitter 23 to read information from the recording medium 27 and to detect focusing and tracking errors.

In operation, the two light beams shown by solid and dotted lines are radiated from the semiconductor laser array 21, and then collimated by the collimating lens 22. The two light beams thus collimated are transmitted through the beam splitter 23, and then focused on the recording medium 27 by the focusing lens 25. The two light beams are reflected from the recording medium 27, and then collimated by the focusing lens 25. The two light beams propagated in the reverse direction are reflected in the direction of the optical detecting system 29 by the beam splitter 23, so that information is read from the recording medium 27 in the optical detecting system 29, and focusing and tracking errors are detected therein. The focusing lens 25 is controlled to be corrected in its position based on the focusing and tracking errors by an actuator (not shown).

Figure 2:
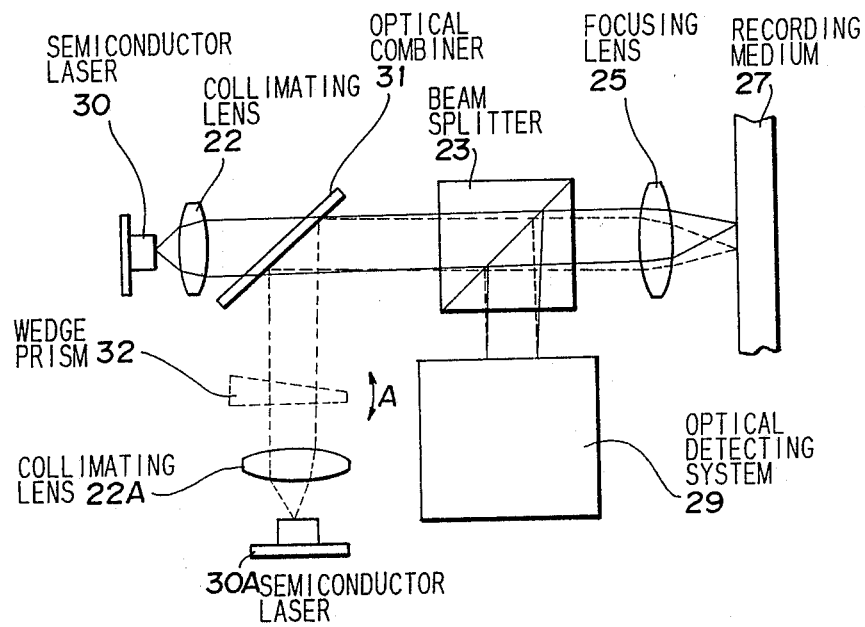

FIG. 2 shows the aforementioned latter optical head wherein like parts are indicated by like reference numerals in FIG. 1. The latter optical head comprises semiconductor lasers 30 and 30A in place of the semiconductor laser array 21, and further comprises a collimating lens 22A for collimating light beam radiated from the semiconductor laser 30A, a wedge prism 32 positioned on a light path of the light beam from the semiconductor laser 30A and for rotating a line connecting beam spots defined on the recording medium 27 by focusing light beams from the semiconductor lasers 30 and 30A thereon, and an optical combiner 31 for combining the light beams from the semiconductor lasers 30 and 30A.

In operation, the light beam which is radiated from the semiconductor laser 30 and then collimated by the collimating lens 22, and the light beam which is radiated from the semiconductor laser 30A and then collimated by the collimating lens 22A are combined by the optical combiner 31, so that the two light beams thus combined are transmitted through the beam splitter 23 to perform the same operation as that explained in FIG. 1.

In FIGS. 1 and 2, the two light beams which are radiated from the semiconductor laser array 21 and the semiconductor lasers 30 and 30A are utilized. In accordance with the adoption of four light emitting sources, four light beams are utilized, so that four beam spots 35 are defined on four corresponding tracks 36 of the recording medium 27 as shown in FIG. 3A. Even if the four beam spots 35 are exactly positioned on the corresponding tracks 36, some of the spots 35 are deviated off the tracks 36 as shown in FIG. 3B due to the mechanical precision of the optical head when it is moved to access the recording medium 27. Such a deviation of beam spots are corrected in accordance with the rotation of a whole optical head in case of the optical head which is shown in FIG. 1, and an angular motion of the wedge prism 32 as shown by an accurate arrow A in case of the optical head which is shown in FIG. 2, so that an angle θ is controlled from a state in FIG. 3B to that in FIG. 3A.

Next, an optical system for focusing light beams on a recording medium in the embodiment according to the invention will be explained in FIG. 4. Although the optical system is adapted to an optical head including an optical disk, it can be applied to a laser printer including a photosensitive drum and so on.

The optical head comprises a semiconductor laser array 21 for emitting two light beams shown by solid and dotted lines, a collimating lens 22 for collimating the two light beams, a beam splitter 23 for transmitting the two light beams and for reflecting two light beams reflected from the recording medium (optical disk) 27 in a predetermined direction, a light image rotating means 24 for rotating a line connecting two beam spots defined on the recording medium 27 by focusing the two light beams thereon, a focusing lens 25 for focusing the two light beams on the recording medium 27, a focusing lens 37 for focusing the two light beams reflected by the beam splitter 23, photodetectors 28A and 28B for converting the two light beams to two electric signals, a differential amplifier 38 for producing control signals to control the light image rotating means 24 based on the two electric signals, and an actuator 26 for moving the focusing lens 25 to correct focusing and tracking errors.

Figure 5A:
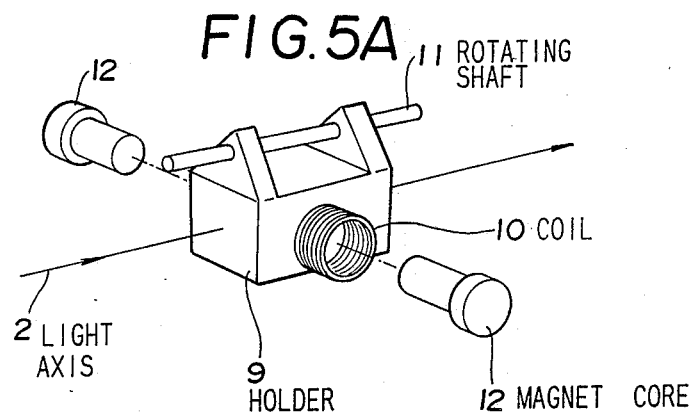
FIGS. 5A and 5B are a perspective view and a front view showing an apparatus for rotating a light image in an embodiment according to the invention.
Figure 5B:
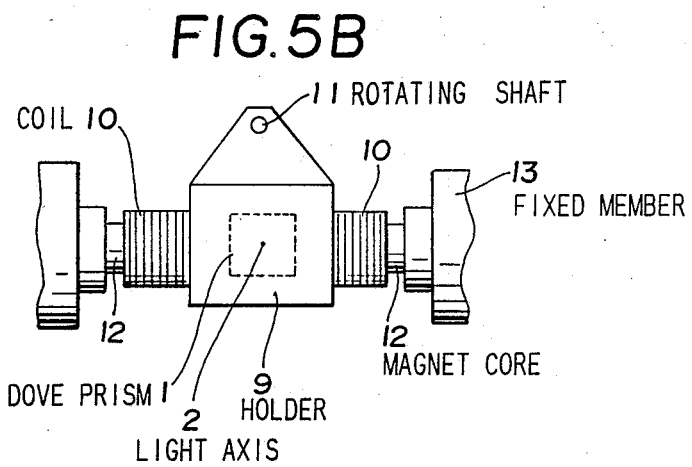

FIGS. 5A and 5B show the light image rotating means which is shown in FIG. 4. The light image rotating means comprises a holder 9 made of a material through which light transmits and for containing a Dove prism 1 (to be explained later in more detail) on a light axis 2, a rotating shaft 11 around which the holder 9 is rotated, a pair of voice coils 10 provided on both sides of the holder 9, and a pair of magnet cores 12 each fixed by a corresponding fixed member 13 and positioned substantially inside the corresponding voice coil 10.

Figure 6:
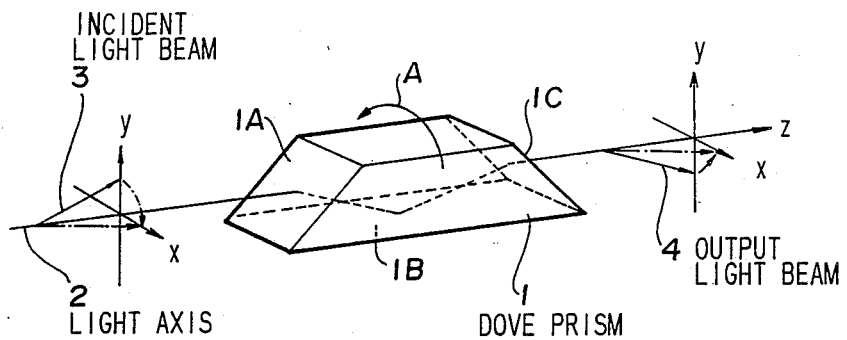
FIG. 6 is an explanatory view showing a Dove prism contained in the apparatus for rotating a light image in the embodiment.

FIG. 6 shows the Dove prism 1 which is contained in the holder 9. The Dove prism 1 has a light incident plane 1A, a light reflection plane 1B, and a light output plane 1C wherein reference numeral 2 indicates a reference light axis along which Z axis is defined, while X and Y axis are defined orthogonal to the reference light axis 2. In a case where an incident light beam 3 which is deviated in the positive direction of Y axis is supplied to the light incident plane 1A of the Dove prism 1, an output light beam 4 supplied from the light output plane 1C is deviated in the negative direction of Y axis for the reason why light of Y axis direction is reversed on the light reflection plane 1B. On the other hand, in a case where an incident light beam which is deviated in X axis direction as shown by a chain line is supplied to the Dove prism 1, an output light beam 4 having the same deviation as that of the incident light beam is obtained as shown by a chain line for the reason why no reversion is occurred in regard to light of X axis direction on the light reflection plane 1B. As understood from the phenomenon explained above, in a case where the direction of an incident light beam is changed from the positive side of Y axis to that of X axis, the direction of an output light beam is changed from the negative side of Y axis to the positive side of X axis.

For these reasons, in a case where the holder 9 is rotated around the rotating shaft 11, so that the Dove prism 1 is rotated on Z axis to the same extent, while the deviation of an incident light beam is fixed, an output light beam is rotated by an angle as twice as a rotating angle of the Dove prism 1 because this is identical to a control in which X and Y axis are rotated simultaneously.

Figure 7:
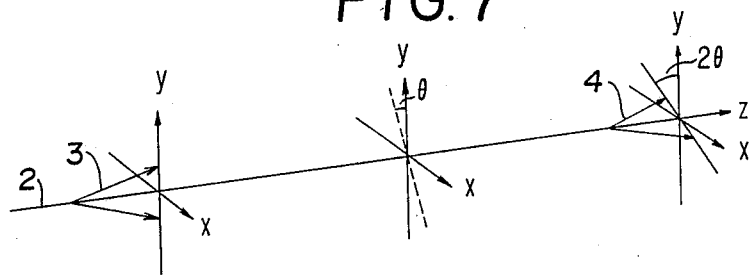
FIG. 7 is an explanatory diagram showing the rotation of a light image by use of the Dove prism.

FIG. 7 shows an example in which the light beams 3 having different incident angles are supplied to a Dove prism (not shown). In this example, in a case where the Dove prism is rotated by an angle $\theta$ as shown by a dotted line, two output light beams 4 are rotated by an angle $2\theta$ as shown by a solid line. As explained in the conventional optical heads, the difference of beam directions results in the difference of focused beam spot positions. Therefore, a line connecting focused beam spots is rotated in the presence of a Dove prism which is inserted into a light path of the optical head in the embodiment according to the invention as shown in FIG. 4.

In accordance with the construction of the optical head and the principle of the light image rotating means including the Dove prism, operation thereof will be explained as follows.

In FIGS. 4 and 5, two light beams are radiated from the semiconductor laser array 21, and then collimated by the collimating lens 22. The two light beams thus collimated are transmitted through the beam splitter 23 and the light image rotating means 24, and then focused on the recording medium 27 by the focusing lens 25. As a result, two beam spots are defined on corresponding tracks of the recording medium 27, respectively. Two light beams reflected from the recording medium 27 are propagated in the reverse direction, and then reflected to be separated from each other. The separated two light beams are focused on corresponding photodetectors 28A and 28B by the focusing lens 37. In one of the photodetectors 28A and 28B, tracking error signal is produced to drive the actuator 26, so that the focusing lens 25 is moved to a predetermined extent based on the tracking error signal. As a result, the two beam spots are moved in a parallel manner. At the same time, differential signal is produced in the differential amplifier to which two tracking error signals are supplied, so that the light image rotating means 24 is rotated around the rotating shaft 11 in a manner that different currents are flowed through the voice coils 10 based on the differential signal, whereby different mechanical forces are produced between opposite sides of the holder 9 in accordance with mutual electromagnetic actions between the voice coils 10 and the magnet cores 12. Accordingly, a line connecting the two beam spots (in other words, "beam spot array") is rotated on the recording medium 27, so that the two beam spots are controlled to be exactly positioned on respective corresponding tracks.

In the embodiment, the Dove prism 1 may be replaced by another optical medium. Such an optical medium is only required in its construction and property to provide an output light beam having a relation of a mirror symmetry relative to an incident light beam.

Figure 8:
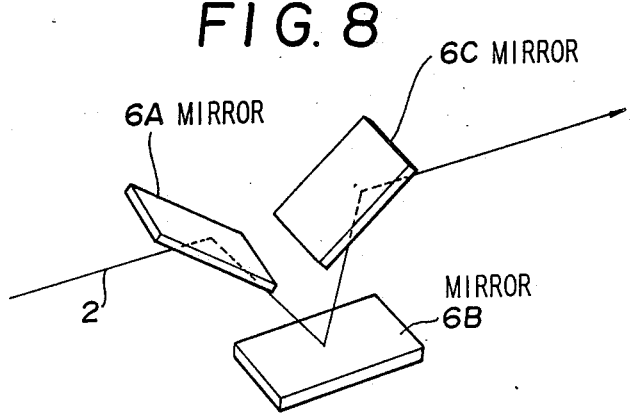
FIGS. 8 to 10 are perspective views showing three types of light image rotating mediums to be contained in the apparatus for rotating a light image in the embodiment.
Figure 9:
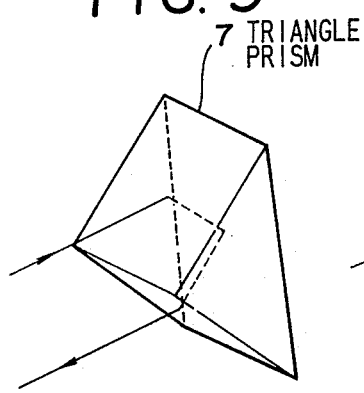
Figure 10:
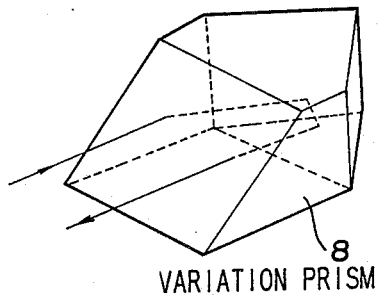

For this purpose, three mirrors 6A, 6B and 6C may be used in its construction so as to be arranged in regard to a reference light axis 2 as shown in FIG. 8. In a case where such an arrangement of three mirrors is further provided in a different direction in addition to the arrangement of the three mirrors 6A, 6B and 6C, that is, there is existed another plane including normals of n other reflection planes in number (where n is odd number), a relation of incident and output light beams is a rotation symmetry. Therefore, this optical arrangement can not be applied to the apparatus and system in the invention, because a direction of an output light beam is not changed in spite of the rotation thereof. As shown in FIGS. 9 and 10, a triangle prism 7 and a variation prism 8 can be applied to the apparatus and system in the invention. In case of the triangle prism 7, the bottom plane is a plane for reflection, while the variation prism 8 has three reflection planes of the bottom and two rear planes. In a case where the triangle prism 7 and the variation prism 8 are rotated on incident light axis respectively, directions of output light beams can be changed. In this case, although the center position of the output light beam is shifted in a parallel manner, the influence of the parallel shift can be negligible in the range of a small rotation angle, if a collimated light beam having a large beam diameter is used therein. As shown in FIGS. 9 and 10, light axis of incident and output light beams may be parallel, and propagating directions thereof are reverse, as being different from those in the aforementioned embodiment.

In the above explanations, although the number of light beams is two, it may be more than three. In addition, although a semiconductor laser array is used for a light source, a plurality of separate light sources may be used.

Although the invention has been described with respect to specific embodiment for complete and clear disclosure, the appended claims are not to be limited but are to be construed as embodying all modification and alternative constructions that may occur to one skilled in the art which fairly fall within the basic teaching herein set forth.

What is claimed is:

1. An apparatus for rotating a light image comprising,
   an optical medium having n reflection planes in number where n is an odd number (n = 1, 3, 5 ...), said optical medium receiving an incident light beam parallel to a reference light axis and transmitting an output light beam parallel to said reference light axis, each of said n reflection planes having a normal included in a predetermined plane including said reference light axis, and
   means for rotating said optical medium around a line, positioned outside said optical medium to be parallel to said reference light axis, by a predetermined angle based on a rotating angle of a light image.

2. An apparatus for rotating a light image according to claim 1,
   wherein said optical medium has m reflection planes in number, where m is an even number (m = 0, 2, 4 ...), each of said m reflection planes having a normal included in a plane including said reference light axis other than said predetermined plane.

3. An apparatus for rotating a light image according to claim 1,
   wherein said means for rotating includes a holder for containing said optical medium, a rotating shaft for supporting said holder rotatively, and an assembly of magnet coil and magnet core for producing a rotating force applied to said holder.

4. An optical system for focusing light beams on a recording medium comprising,
   means for radiating a plurality of light beams,
   a focusing lens for focusing said plurality of light beams on said recording medium, and
   a light image rotating unit positioned between said means for radiating and said focusing lens,
   wherein said light image rotating unit includes,
   an optical medium having n reflection planes in number, where n is an odd number (n = 1, 3, 5 ...), said optical medium receiving an incident light beam parallel to a reference light axis and transmitting an output light beam parallel to said reference light axis, each of said n reflection planes having a normal included in a predetermined plane including said reference light axis, and
   means for rotating said optical medium around a line parallel to said reference light axis by a predetermined angle based on a rotating angle of a light image.

* * * * *